US00RE36635E

United States Patent [19]

Vosbikian et al.

[11] E Patent Number: Re. 36,635

[45] Reissued Date of Patent: Apr. 4, 2000

[54] SPONGE MOP ATTACHMENT

[76] Inventors: Peter S. Vosbikian, 408 Pond View Dr., Moorestown, N.J. 08057; Haig Vartanian, deceased, late of Cheltenham, Pa.; by Arthur Momjian, executor, 1211 Norsam Rd., Gladwyne, Pa. 19035

[21] Appl. No.: 09/018,661

[22] Filed: Feb. 4, 1998

Related U.S. Patent Documents

Reissue of:

[64] Patent No.: 5,488,750
Issued: Feb. 6, 1996
Appl. No.: 08/415,180
Filed: Mar. 31, 1995

U.S. Applications:

[63] Continuation-in-part of application No. 08/308,410, Sep. 19, 1994, abandoned.

[51] Int. Cl.[7] ..... A47L 13/12; A47L 13/46

[52] U.S. Cl. ..... 15/119.2; 15/118

[58] Field of Search ..... 15/116.1, 116.2, 15/118, 119.1, 119.2, 246

[56] References Cited

U.S. PATENT DOCUMENTS

| | | |
|---|---|---|
| D. 358,487 | 5/1995 | Kneesch . |
| 603,999 | 5/1898 | Ballam . |
| 2,472,781 | 6/1949 | Vosbikian . |
| 2,534,086 | 12/1950 | Vosbikian . |
| 2,641,787 | 6/1953 | Vosbikian . |
| 2,643,407 | 6/1953 | Vosbikian . |
| 2,701,888 | 2/1955 | Vosbikian . |
| 2,730,741 | 1/1956 | Gantz . |
| 2,834,035 | 5/1958 | Vosbikian . |
| 2,858,557 | 11/1958 | Zottola . |
| 2,895,152 | 7/1959 | Vosbikian . |
| 2,916,754 | 12/1959 | Zottola . |
| 2,935,754 | 5/1960 | Abdo et al. . |
| 3,964,121 | 6/1976 | Kim . |
| 4,491,998 | 1/1985 | Wilson et al. . |
| 4,654,920 | 4/1987 | O'Neil et al. . |
| 5,483,720 | 1/1996 | Decoopman . |

*Primary Examiner*—Randall E. Chin
*Attorney, Agent, or Firm*—Stuart M. Goldstein

[57] ABSTRACT

A butterfly sponge mop which is used for routine surface cleaning and moisture absorbing mopping and an integral unitary mop scrubber attachment with an outer abrasive surface which is to be used on the head of the sponge mop for cleaning more difficult and ingrained soiled surfaces. The mop attachment consists of two detent tabs which are to be inserted into the existing cutouts located in the sponge support member of the mop. The attachment also has side holes for placement over the existing holes of the mop's support member, through which the ends of the mop's squeeze arms are inserted. The mop attachment is readily and easily removable from the sponge mop and is interchangeably designed to be used with existing or new butterfly sponge mops. In another embodiment the mop attachment and the mop's sponge support member is formed with the scrubber component as a single, molded plastic component.

40 Claims, 7 Drawing Sheets

SPONGE MOP ATTACHMENT

Matter enclosed in heavy brackets [ ] appears in the original patent but forms no part of this reissue specification; matter printed in italics indicates the additions made by reissue.

This is a continuation-in-part of application Ser. No. 308,410, filed Sep. 19, 1994, and now abandoned.

BACKGROUND OF THE INVENTION

[Buttery] *Butterfly* sponge mops have been used with great success as an efficient cleaning tool for many [yes] *years*. The feature of the mop which allows its sponge to pivot closed, thereby squeezing fluid from a fully soaked or soiled sponge, has been a major advance in the industry. The [buttery] *butterfly* sponge mop patent, U.S. Pat. No. 2,643,407, is representative of this type of mop.

It is similarly well-known to employ a brush or other abrasive member at the end of a [buttery] *butterfly* sponge type mop, in order to allow for a separate scrubbing action, along with the smooth surface cleaning action and absorption capability of the relatively soft sponge mop. Such mops, as shown in the prior [an] *art*, routinely contain a brush device attached to the head or front of a mop, at right angles to the sponge member. The mop arrangements shown in U.S. Pat. Nos. 2,701,888, 2,858,557, and 2,916,754 are illustrative of these features. The configuration of these mops, however, employ cumbersome brush attachments which can not be removed or be removed easily, do not allow for interchangeability of parts, are not [desired] *designed* to have the abrasive surface changed after prolonged usage, and generally do not [pro, de] *provide* simple and effective cleaning implements. Significantly, these abrasive attachments are not adapted for use with the [buttery] *butterfly* sponge mop designs which are currently in use.

SUMMARY OF THE INVENTION

It is the object of the present invention to overcome the limitations and disadvantages of prior butterfly sponge mops and mop attachments.

It is another object of the invention to provide a butterfly sponge mop attachment with an abrasive cleaning surface, which attachment can readily and easily be removed from the head of a butterfly sponge mop.

It is a further object of the invention to provide a butterfly sponge mop attachment with an abrasive cleaning surface, which attachment is designed and formed to be readily used with existing butterfly sponge mops.

It is still another object of the invention to provide a butterfly sponge mop attachment with an abrasive cleaning surface, which attachment comprises a standardized unitary integral member which is interchangeable and designed and formed to be used with different butterfly sponge mops.

It is still another object of the invention to provide a butterfly sponge mop attachment with an outer abrasive surface which can readily and easily be removed and replaced.

It is a further object of the invention to provide a butterfly sponge mop with a mop attachment with an abrasive cleaning surface, resulting in a sponge mop which is compact, lightweight, easy and flexible to use.

The present invention comprises a butterfly sponge mop which is used for routine surface cleaning and moisture absorbing mopping and an integral unitary mop attachment with an outer abrasive surface, designed and formed to be used on the head of the sponge mop for cleaning more difficult and ingrained soiled surfaces. The mop attachment consists of two detent tabs which are to be inserted into the existing cutouts located in the support member of the butterfly sponge mop. The attachment also has two side holes for placement over the existing holes of the mop's support member, through which the ends of the mop's squeeze arms are inserted. In another embodiment of the invention, the mop's sponge support member is formed with the outer abrasive surface scrubber component as a single member, advantageously formed from molded plastic construction.

The novel features which are considered as characteristic of the invention are set forth in particular in the appended claims. The butterfly sponge mop and its mop attachment themselves, however, both as to their design, construction, and use, together with additional features and advantages thereof, are best understood upon review of the following detailed description with reference to the accompanying drawings.

DETAILED DESCRIPTION OF THE INVENTION

Figure 1:
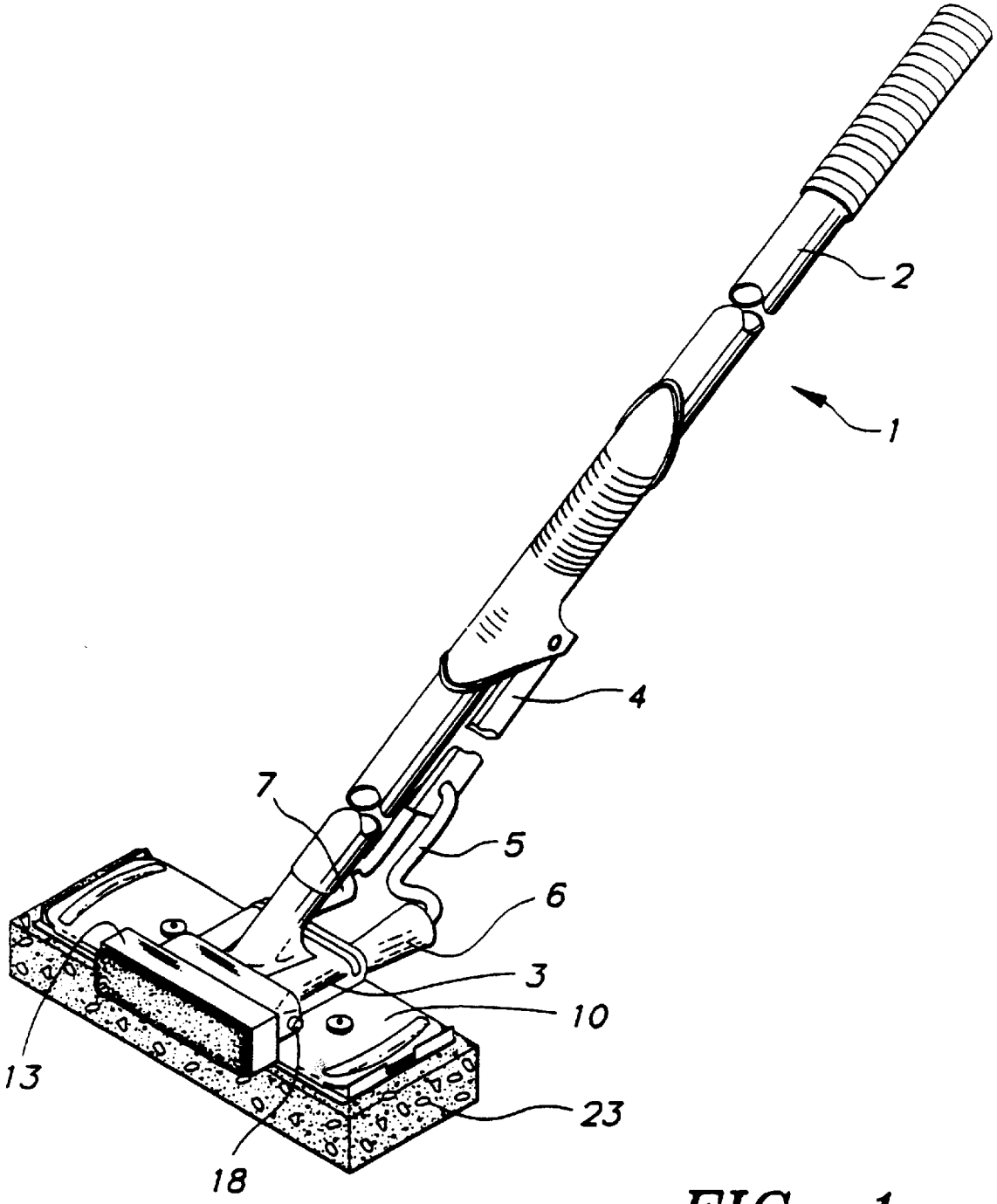
FIG. 1 is a view of the butterfly sponge mop with the mop attachment in place in its use mode.

Butterfly sponge mop 1 consists of handle 2 connected to sponge support member 3. Lever rod 4 is pivotally attached to handle 2 at one end. A squeeze member 5, consisting of dual squeeze arms 6 and 7, is positioned through the end of the lever rod 4.

In the mop's use mode, shown in FIG. 1, the ends of the squeeze arms 6 and 7 are positioned in holes 8 and 9, located on both sides of the support member 3. Sponge component 23 is connected to base plate 10, on which support member 3 is mounted. Base plate 10 is pivoted by spring action, which is a well known feature in the butterfly sponge mop industry.

Figure 2:
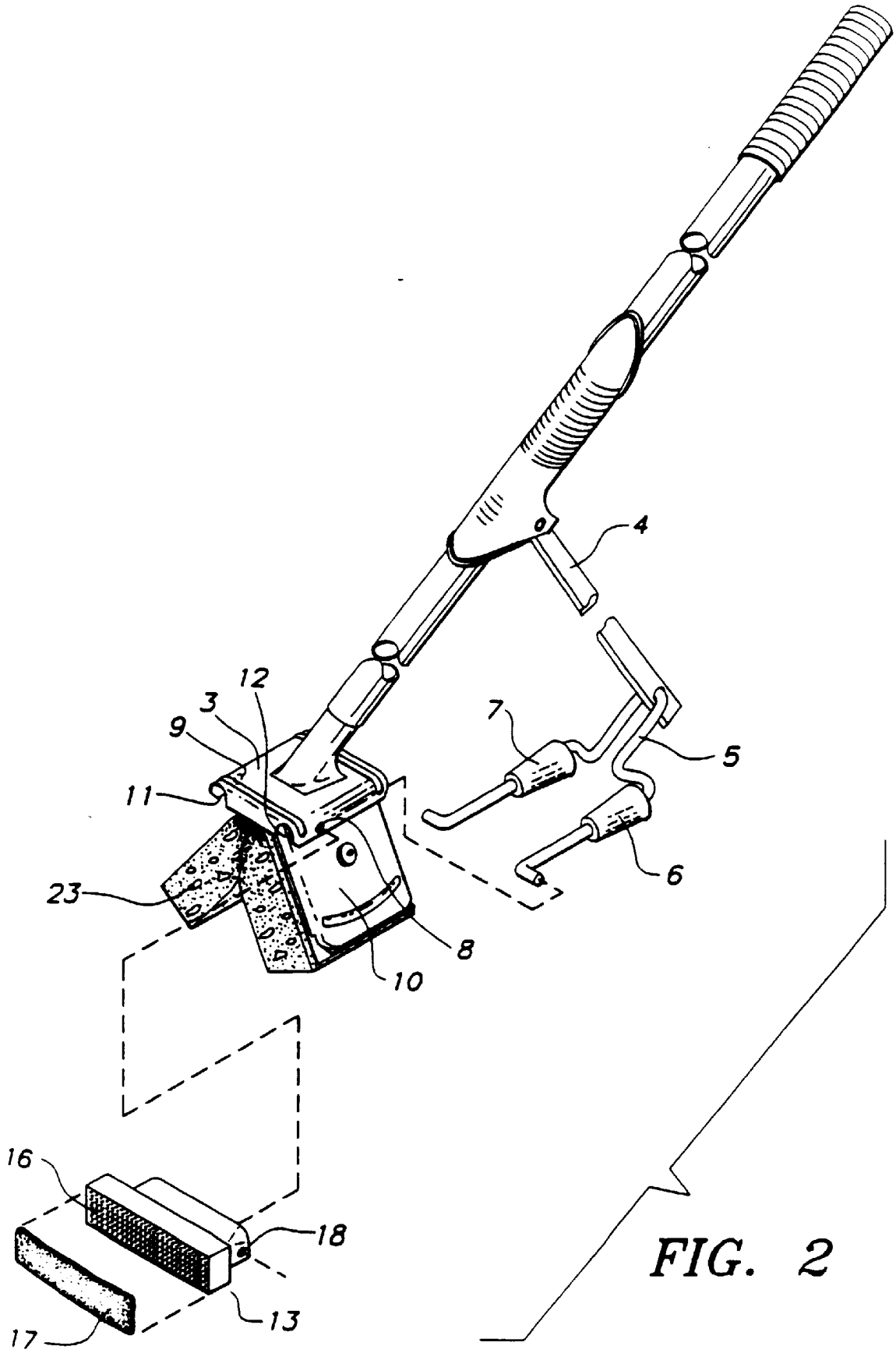
FIG. 2 is an exploded view of the components of the butterfly sponge mop and mop attachment in their detached position.
Figure 3:
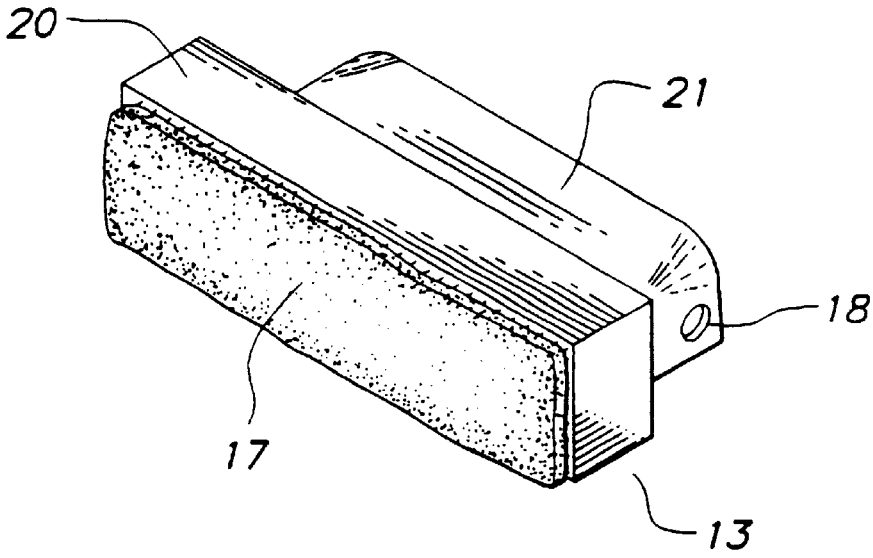
FIG. 3 is a perspective view of the upper side of the mop attachment.
Figure 4:
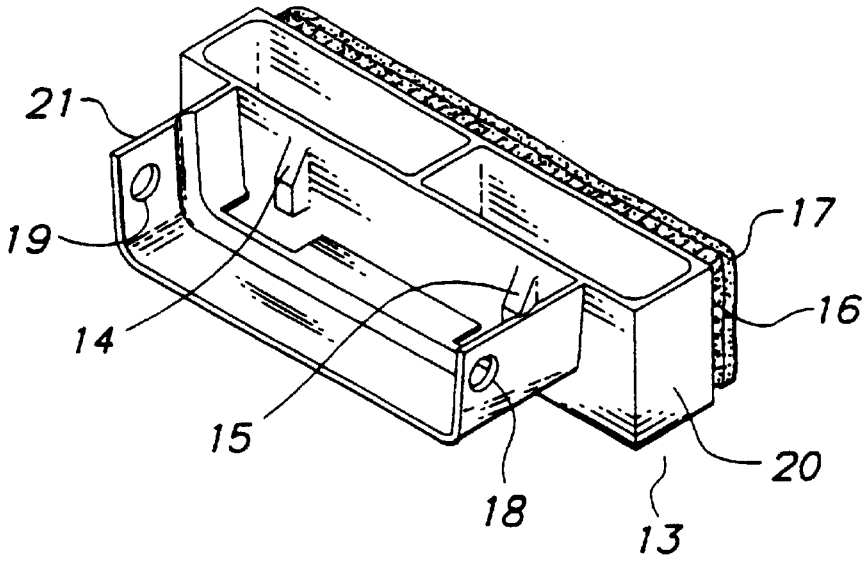
FIG. 4 is a perspective view of the lower side of the mop attachment.
Figure 5:
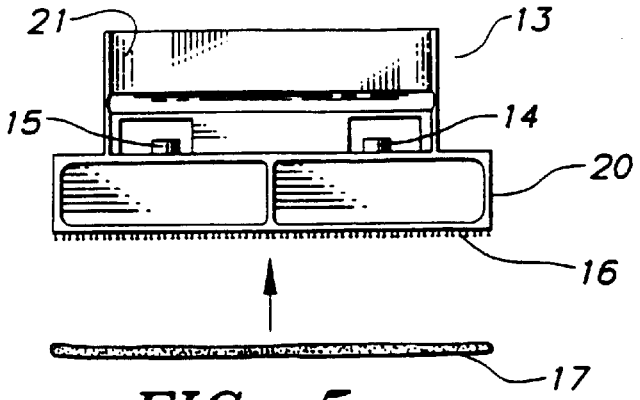
FIG. 5 is a bottom plan view of the mop attachment with its abrasive surface detached.
Figure 6:
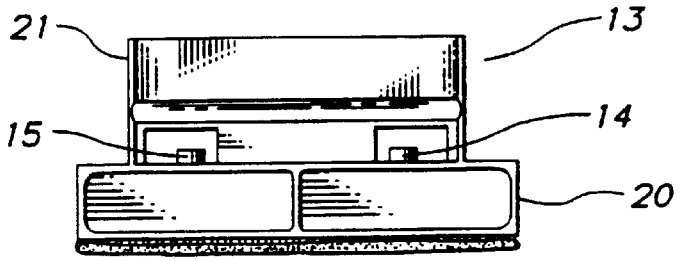
FIG. 6 is a bottom plan view of the mop attachment with its abrasive surface attached.
Figure 7:
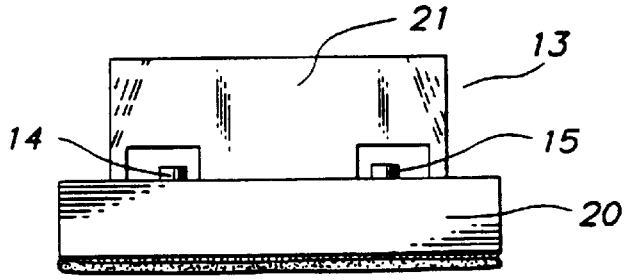
FIG. 7 is a top plan view of the mop attachment with its abrasive surface attached.
Figure 8:
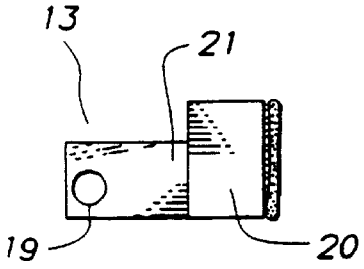
FIG. 8 is a side elevation view of the mop attachment with its abrasive surface attached.
Figure 9:
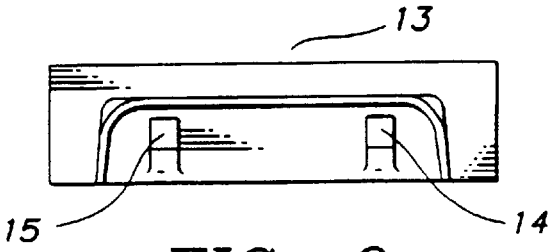
FIG. 9 is a rear elevation view of the mop attachment.
Figure 10:
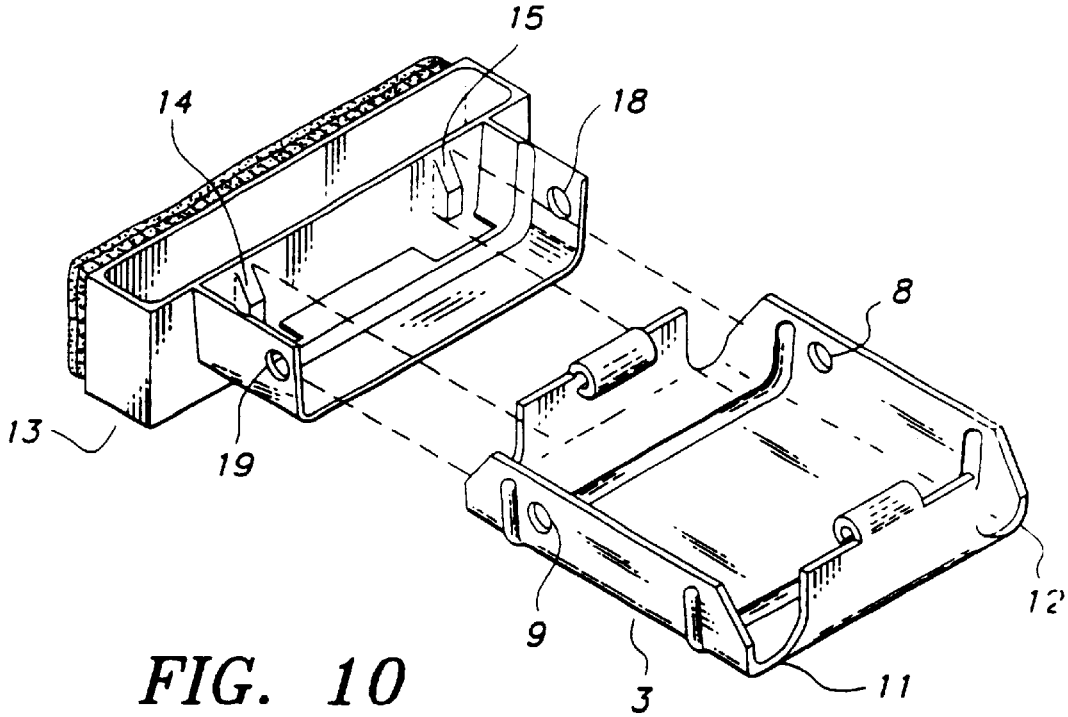
FIG. 10 is a perspective view of the lower side of the mop attachment lined up for insertion into the mop sponge support member.
Figure 11:
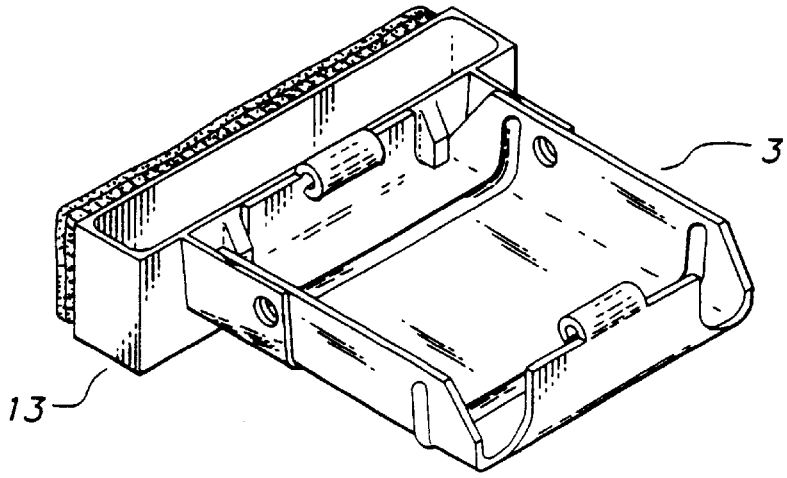
FIG. 11 is a perspective view of the lower side of the mop attachment in place with the mop sponge support member.

Support member 3 has two cut-outs 11 and 12, best shown in FIGS. 2, 10, and 11. These cut-outs are designed to receive detent tabs 14 and 15 located on mop attachment 13. Mop attachment 13 is an integral unitary body which also consists of an attachment surface 16, which could be Velcro™ or similar material. This surface 16 is located on the front section 20 of the mop attachment. Removable outer abrasive surface strip 17 is attached to surface 16.

Mop attachment 13 has two holes 18 and 19 through extending rear section 21 of mop attachment 13. In the mop's use mode, shown in FIG. 1, the ends of squeeze arms 6 and 7 are positioned through holes 8 and 9, located on either side of the support member 3, and then through holes 18 and 19 of the mop attachment 13, as more fully set forth in detail below.

Mop attachment 13 can easily be attached to sponge mop 1 by first manually pivoting base plate 10 downward, as best shown in FIG. 2. Arms 6 and 7 are then manually squeezed together, thereby allowing removal of squeeze member 5 from holes 8 and 9 of support member 3. Mop attachment 13 is slid over support member 3 such that the detents 14 and 15 are inserted into cut-outs 11 and 12 of the support member 3 and holes 18 and 19 of the mop attachment 13 are aligned over and with holes 8 and 9 of the support member 3. Arms 6 and 7 of squeeze member 5 are once again manually squeezed together and reinserted into the back side of support member 3. The end of arm 6 is lined up with the holes 8 and 18 and the end of arm 7 is lines up with holes 9 and 19. The manual squeezing pressure on arms 6 and 7 is released, thus permitting the end of arm 6 to enter holes 8 and 18 and the end of arm 7 to enter holes 9 and 19. The mop attachment 13 is thereby securely attached to support member 3 and thus sponge mop 1.

Removal of mop attachment 13 is easily accomplished by pivoting base plate 10 downward, squeezing arms 6 and 7 together, removing squeeze member 5, and sliding mop attachment 13 off support member 3.

In the use mode, the sponge mop can be employed in the usual fashion, with sponge 23 being used to clean or absorb moisture from horizontal, e.g. floor, surfaces. Should there be a need for more concentrated scrubbing action, e.g. when a deep-seated or ingrained soiled area is encountered, the mop can simply be flipped over and the abrasive surface 17 of the mop attachment 13 used for cleaning.

Figure 13:
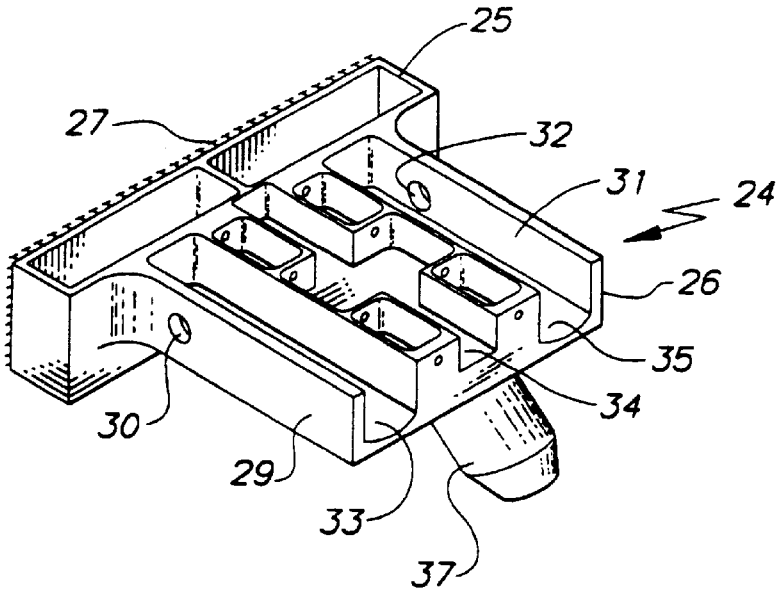
FIG. 13 is a perspective view of the bottom of the alternate embodiment of the single piece mop support member with integral scrubber section.
Figure 14:
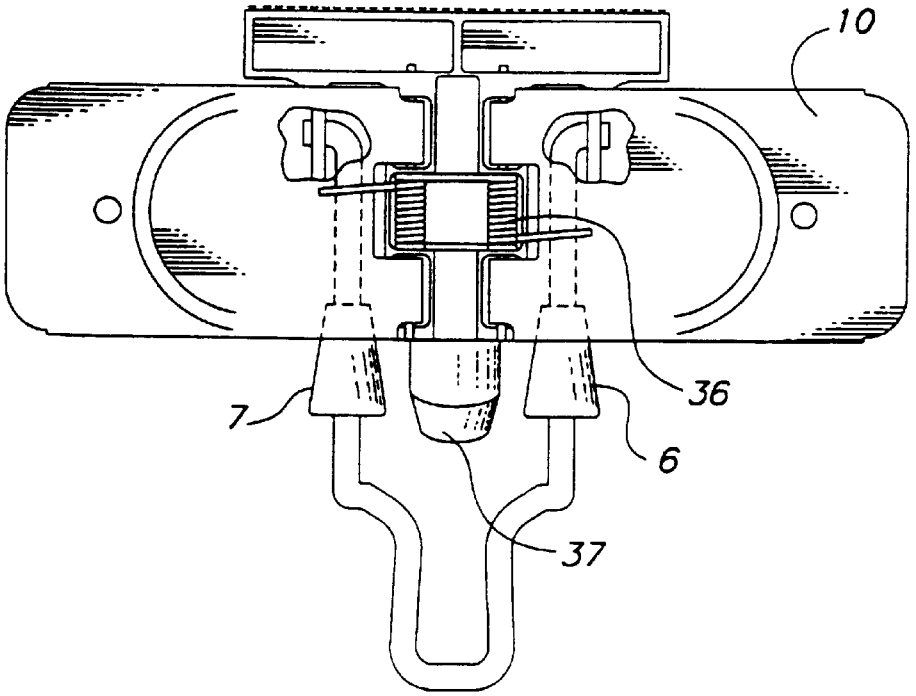
FIG. 14 is a bottom plan view of the alternate embodiment of the single piece support member with the relevant section of the butterfly sponge mop in place.

When the mop attachment 13 is in place in support member 3, an integral unitary component is formed, as shown in FIG. 11. In an alternate embodiment, this component, made up of mop attachment 13 and support member 3, can be made as one solid piece. This single piece component and its use on the sponge mop are shown in FIGS. 12, 13, and 14.

Figure 12:
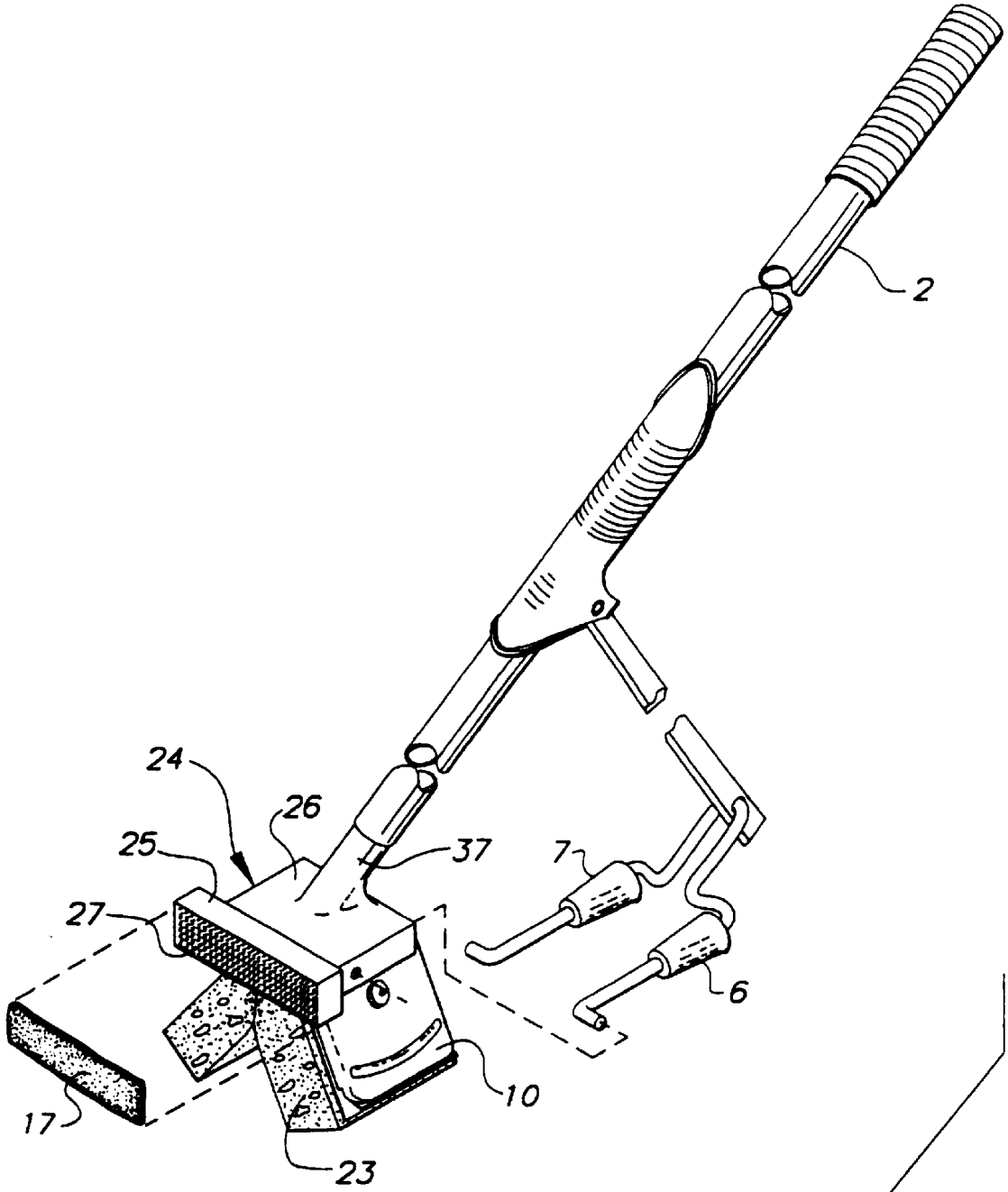
FIG. 12 is an exploded view of the butterfly sponge mop with the alternate embodiment of the mop attachment single piece support member.

Specifically, FIG. 12 shows cleaning implement support member 24, which is a single component of unitary construction. It supports the cleaning implements of the mop, the sponge 23, by means of base plate 10, and the outer abrasive surface strip 17, located on attachment surface 27. Support member 24 is most advantageously formed as a one piece molded plastic component, by well known injection molded construction processes.

Support member 24 consists of a forward section 25, the outermost surface of which comprises attachment surface 27. As best seen in FIG. 13, rearward section 26 of support member 24 consists of side surface 29 with hole 30 therethrough and opposite side surface 31 and hole 32 therethrough. The bottom of rearward section 26 comprises channels 33, 34, and 35. As shown in FIG. 14, the baseplate 10 of the sponge mop is connected to support member 24 by means of a spring member 36, which is positioned within the central area of channel 34. The use of such spring members in this manner is common to pivoting butterfly sponge mops.

Tubular section 37 is an integral part of support member 24 and is upstanding from rearward section 26. It is adapted to connect with handle 2 of the sponge mop. Tubular element 37 can be designed to be inserted and tightly fit into the handle or, alternatively, the handle can be inserted into the end of the tubular element.

In the mop's use mode, support member 24 is secured to base plate 10 with the known spring means 36, as described above. Squeeze arms 6 and 7 are squeezed together and positioned in channels 33 and 35 respectively. The ends of the arms then are positioned through holes 30 and 32, located on opposite side surfaces of support member 24. After the squeeze arms are released and their ends are resting within the holes 30 and 32, the mop is ready for use with its sponge and scrubber components, in the same manner as was previously described for the embodiment shown in FIG. 1.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

What is claimed:

1. A butterfly sponge mop comprising:

(a) a sponge support member with two side surfaces, each side having a hole therethrough;

(b) dual squeeze arms each arm having an end, one end to be inserted into one side hole of the sponge support member and the other end to be inserted into the other side hole of the sponge support member;

(c) a mop attachment for use on the sponge mop, said mop attachment comprising:

(1) an integral unitary body;

(2) an outer abrasive surface attached to the body;

(3) detent tab means extending from the body for insertion into the sponge support member of the mop;

(4) dual hole means in the body for placement over the holes on the side surfaces of the sponge support member of the mop and for insertion of the ends of the dual squeeze arms.

2. A butterfly sponge mop as described in claim 1 in which said mop attachment body has a front section and a rear section extending from the front section.

3. A butterfly sponge mop as described in claim 2 in which the detent tab means extend from the front section of the body.

4. A butterfly sponge mop as described in claim 2 in which the dual hole means are located in the rear section of the body.

5. A butterfly sponge mop as described in claim 1 in which the outer abrasive surface is removable from and reattachable to the mop attachment body.

6. A removable mop attachment for use on a butterfly sponge mop having dual squeeze arms with ends which are inserted into holes on the sides of a sponge support member mounted on the mop, said mop attachment comprising:

(a) an integral unitary body;

(b) [An] *an* outer abrasive surface attached to the body;

(c) detent tab means extending from the body for insertion into the sponge support member of the mop;

(d) dual hole means in the body for placement over the holes on the sides of the sponge support member of the mop and for insertion of the ends of the dual squeeze arms.

7. A removable mop attachment as described in claim 6 in which said unitary body has a front section and a rear section extending from the front section.

8. A removable mop attachment as described in claim 7 in which the detent tab means extend from the front section of the body.

9. A removable mop attachment as described in claim 7 in which the dual hole means are located in the rear section of the body.

10. A removable mop attachment as described in claim 6 in which the outer abrasive surface is removable from and reattachable to the body.

11. A butterfly sponge mop with a sponge, a sponge supporting base plate, and a handle, said mop further comprising:

a. a single piece cleaning implement support member of unitary construction comprising:

(i) a forward section and a rearward section;

(ii) said forward section extending outward from the rearward section and above the sponge supporting base plate, said forward section further having surface attachment means for attaching an independently removable separate outer abrasive surface;

(iii) said rearward section having two side surfaces, each side surface having a hole therethrough, said rearward section further comprising means to connect the cleaning implement support member to the sponge supporting base plate; and b. dual squeeze arm means which contact and pivot the sponge supporting base plate, each arm of the dual squeeze arm means having an end, one end to be inserted into the hole through one side surface of the rearward section of the cleaning implement support member and the other end means to be inserted into the hole through the second side surface of the rearward section of the cleaning implement support member.

12. A butterfly sponge mop as described in claim 11 further comprising handle attachment means integral with and upstanding from the cleaning implement support member, for joinder with the sponge handle.

13. A butterfly sponge mop as described in claim 11 in which the outer abrasive surface is reattachable to the cleaning implement support member after it is removed.

14. A butterfly sponge mop as described in claim 11 in which the cleaning implement support member is a molded plastic piece.

15. A single piece cleaning implement support member of unitary construction for use on a butterfly sponge mop having a sponge, a handle, and dual squeeze arms which contact and pivot a sponge supporting base plate, said cleaning implement support member comprising:

a. a forward section and a rearward section;

b. said forward section extending outward from the rearward section and above the sponge supporting base plate, said forward section further having surface attachment means for attaching an independently removable separate outer abrasive surface;

c. said rearward section having two side surfaces, each side surface having hole means therethrough, one hole means for the insertion of one of the dual squeeze arms and the other hole means for the insertion of the other of the dual squeeze arms; and d. said rearward section also having means to connect the cleaning implement support member to the sponge supporting base plate.

16. A unitary cleaning implement support member as described in claim 15 further comprising handle attachment means integral with and upstanding from the rearward section of the cleaning implement support member.

17. A unitary cleaning implement support member as described in claim 15 in which the outer abrasive surface is reattachable to the cleaning implement support member after it is removed.

18. A unitary cleaning implement support member as described in claim 15 which is a molded plastic piece.

19. A butterfly sponge mop with a sponge and sponge supporting base plate, said mop further comprising:

a. cleaning implement support means comprising:

(i) a forward section and a rearward section;

(ii) said forward section extending outward from the rearward section and above the sponge supporting base plate, said forward section further having surface attachment[s] means for attaching an independently removable separate outer abrasive surface;

(iii) said rearward section having two side surfaces, each side surface having a hole therethrough, said rearward section further comprising means to connect the cleaning implement support [member] *means* to the sponge supporting base plate; and b. dual squeeze arm means which contact and pivot the sponge supporting base plate, each arm of the dual squeeze arm means having an end, one end to be inserted into the hole through one side surface of the rearward section of the cleaning implement support [member] *means* and the other end to be inserted into the hole through the second side surface of the rearward section of the cleaning implement support [member] *means*.

20. A butterfly sponge mop as described in claim 19 in which the outer abrasive surface is reattachable to the cleaning implement support [member] *means* after it is removed.

21. A butterfly sponge mop as described in claim 19 further comprising a handle and handle attachment means integral with and upstanding from the cleaning implement support [member] *means*, for joinder with the sponge handle.

22. A butterfly sponge mop as described in claim 19 in which the cleaning implement support means is a single piece member of unitary construction.

23. A butterfly sponge mop as described in claim 22 in which the cleaning implement support [member] *means* is a molded plastic piece.

24. A butterfly sponge mop as described in claim 19 in which the forward section is a removable independent mop attachment comprising means to unite with the rearward section.

25. A butterfly sponge mop as described in claim 24 in which the mop attachment is an integral unitary body and the means to unite comprises detent tab means extending from the mop attachment for insertion into the rearward section and dual hole means in the mop attachment for placement over the holes on the side surfaces of the rearward section and for insertion of the ends of the dual squeeze arm means.

26. A butterfly sponge mop as described in claim 19 in which the cleaning implement support [member] *means* is a single molded plastic piece.

*27. A butterfly sponge mop comprising:*

(*a*) *a sponge support member with two side surfaces, each side surface having a side opening therethrough;*

(*b*) *dual squeeze arms having ends to be inserted into the openings in the respective side surfaces of the sponge support member;*

(*c*) *a mop attachment for use on the sponge mop, said mop attachment comprising:*

(*1*) *an integral unitary body with at least two planar side means in nestled contact with the side surfaces of the sponge support member;*

(*2*) *an outer abrasive surface attached to the body;*

(*3*) *detent means extending from the body for insertion into the sponge support member;*

(*4*) *opening means in the body positioned in alignment with the side surface openings of the sponge support member of the mop for allowing passage of the ends of the dual squeeze arms, each arm extending passed one of said planar side means.*

*28. A removable attachment for use on a butterfly sponge mop having dual squeeze arms with ends which are inserted into side surface openings of a sponge support member mounted on the mop, said attachment comprising;*

(*a*) *an integral unitary body without least two planar side means in nestled contact with side surfaces of the sponge support member;*

(*b*) *an outer abrasive surface attached to the body;*

(*c*) *detent means extending from the body for insertion into the sponge support member;*

(*d*) *opening means in the body positioned in alignment with the side surface openings of the sponge support member for allowing passage of the ends of the dual squeeze arms and for allowing each arm to extend passed one of said planar side means.*

*29. A butterfly sponge mop with a sponge, a sponge supporting base plate, and a handle, said mop further comprising:*

(*a*) *a cleaning implement support member of compact unitary, single piece construction comprising:*

(*1*) *a forward section and a rearward section;*

(*2*) *said forward section extending outward from the rearward section and forward and above the sponge supporting base plate, said forward section comprising a rear surface integrally merged into the rearward section, a forwardmost facing surface being shorter in length than the length of the base plate, and side surfaces integral with and extending from the forwardmost facing surface towards the rearward section;*

(*3*) *said rearward section having at least two planar surfaces;*

(*b*) *means to connect the cleaning implement support member to the sponge supporting base plate;*

(*c*) *an abrasive surface means mounted on the forwardmost facing surface; and*

(*d*) *dual squeeze arm means which contact and pivot the sponge supporting base plate, one arm of the dual squeeze arm means to be inserted passed one planar surface of the rearward section of the cleaning implement support member and the other arm to be inserted passed the second planar surface of the rearward section of the cleaning implement support member.*

*30. A butterfly sponge mop as described in claim 29 in which the cleaning implement support member is a single molded plastic piece.*

*31. A butterfly sponge mop as described in claim 29 further comprising handle attachment means integral with and upstanding from the rearward section of the cleaning implement support member.*

*32. A butterfly sponge mop as described in claim 31 in which the cleaning implement support member is a single molded plastic piece.*

*33. A single piece cleaning implement support member for use on a butterfly sponge mop having a sponge, a handle, and dual squeeze arms which contact and pivot a sponge supporting base plate, said cleaning implement support member being of compact unitary, single piece construction and comprising;*

(*a*) *a forward section and a rearward section;*

(*b*) *said forward section extending outward from the rearward section and forward and above the sponge supporting base plate, said forward section comprising a rear surface integrally merged into the rearward section, a forwardmost facing surface being shorter in length than the length of the base plate, and side surfaces integral with and extending from the forwardmost facing surface towards the rearward section;*

(*c*) *said rearward section having two planar surfaces, one arm of the dual squeeze arms to be inserted passed one planar surface of the rearward section and the other arm to be inserted passed the second planar surface;*

(*d*) *said rearward section also having means to connect the cleaning implement support member to the sponge supporting base plate; and*

(*e*) *an abrasive surface means mounted on the forwardmost facing surface.*

*34. A single piece cleaning implement support member as described in claim 33 in which the member is a single molded plastic piece.*

*35. A single piece cleaning implement support member as described in claim 33 further comprising handle attachment means integral with and upstanding from the rearward section of the cleaning implement support member.*

*36. A single piece cleaning implement support member as described in claim 35 in which the member is a single molded plastic piece.*

*37. A butterfly sponge mop with a sponge, a sponge support member with two side surfaces, and a sponge supporting base plate, said mop further comprising:*

(*a*) *cleaning implement support means comprising:*

(*1*) *a forward section and a rearward section;*

(*2*) *said forward section extending outward from the rearward section and above the sponge supporting base plate, said forward section further having a forward facing surface and abrasive surface means mounted on the forward facing surface;*

(*3*) *the rearward section having at least two planar surfaces positioned in nestled contact with the side surfaces of the sponge support member;*

(*4*) *means to connect the cleaning implement support means to the sponge support member; and*

(*b*) *dual squeeze arm means which contact and pivot the sponge supporting base plate, each arm of the dual squeeze arm means extending passed one of said planar surfaces of said cleaning implement support means.*

*38. A butterfly sponge mop comprising:*

(*a*) *an axially elongated handle;*

(*b*) *a mop head of compact unitary, single piece construction comprising:*

(*1*) *a forward and a rearward section;*

(*2*) *said forward section extending outward from the rearward section and comprising a rear surface integrally merged into the rearward section and a forward facing surface;*

(*c*) *a sponge;*

(*d*) *a pair of sponge support plates having said sponge mounted thereon, pivotally connected to said head at mutually proximate edges thereof for converging pivotal movement from co-planar disposition towards one another, the forward facing surface being shorter in length than the combined lengths of the support plates and being located above the support plates and at least as forward as the forward-most surface of the support plates;*

(*e*) *means connected to said head for biasing said plates towards said position of co-planar disposition;*

(*f*) *means movable along a central position of said handle for urging said plates to converge pivotally towards one another with increasing force as said movable means is moved along said handle towards said head;*

(*g*) *an abrasive surface means mounted on the forward facing surface of said head, whereby when the sponge support plates are pivoted, the abrasive surface means remains stationary in relation to the support plates and above and forward of the support plates.*

*39. A butterfly sponge mop with a sponge, a sponge support member with side surfaces and a forwardmost surface, and a sponge supporting base plate, said mop further comprising:*

(*a*) *cleaning implement support means comprising an integral unitary body, said body comprising:*

(*i*) *a forward facing surface located above and at least as forward as the forwardmost surface of the sponge support member;*

(*ii*) *a rearward section positioned in nestled contact with the side surfaces of the sponge support member;*

(*iii*) *an abrasive surface means mounted on the forward facing surface and above the sponge supporting base plate; and*

(*iv*) *means to connect the cleaning implement support means to the sponge support member;*

(*b*) *dual squeeze arm means which contact and pivot the sponge supporting base plate, each arm of the dual squeeze arm means being positioned at least in part within the cleaning implement support means, whereby when the dual squeeze arm means pivot the sponge supporting base plate, the abrasive surface means remains stationary in relation to the sponge supporting base plate and above and forward of the sponge supporting base plate.*

*40. A butterfly sponge mop as described in claim 39 in which the cleaning implement support means further comprises at least two planar surfaces and each arm of the dual squeeze arm means has an end, whereby one arm is positioned at least in part within the cleaning implement support means with its end extending passed one planar surface and the other arm is positioned at least in part within the cleaning implement support means with its end extending passed the second planar surface.*

* * * * *